United States Patent
Cho (10) Patent No.: US 7,110,197 B2
(45) Date of Patent: Sep. 19, 2006

(54) METHOD FOR DETERMINING A TYPE OF HEAD, AND METHOD FOR OPTIMIZING A WRITE PARAMETER USING THE HEAD TYPE DETERMINING METHOD IN A HARD DISC DRIVE

(75) Inventor: Jae-deog Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/950,812

(22) Filed: Sep. 28, 2004

(65) Prior Publication Data

US 2005/0078393 A1 Apr. 14, 2005

(30) Foreign Application Priority Data

Oct. 8, 2003 (KR) ............. 10-2003-0070035

(51) Int. Cl.
*G11B 27/36* (2006.01)
(52) U.S. Cl. ............. 360/31; 360/53; 360/25; 360/69; 360/48
(58) Field of Classification Search ............. None
See application file for complete search history.

(56) References Cited

U.S. PATENT DOCUMENTS

| | | | | | |
|---|---|---|---|---|---|
| 4,967,289 | A | * | 10/1990 | Kanota et al. ............ | 386/104 |
| 5,537,264 | A | * | 7/1996 | Pinteric .................... | 360/31 |
| 5,600,500 | A | * | 2/1997 | Madsen et al. ............ | 360/46 |
| 6,005,725 | A | * | 12/1999 | Emo et al. ................. | 360/31 |
| 6,075,664 | A | * | 6/2000 | Shimizu .................... | 360/46 |
| 6,101,053 | A | * | 8/2000 | Takahashi ................. | 360/46 |
| 6,118,614 | A | * | 9/2000 | Lee ........................... | 360/75 |
| 6,275,346 | B1 | * | 8/2001 | Kim et al. ................. | 360/31 |
| 6,493,176 | B1 | * | 12/2002 | Deng et al. ............. | 360/78.05 |
| 6,657,428 | B1 | * | 12/2003 | Kim .......................... | 324/210 |
| 6,696,832 | B1 | * | 2/2004 | Chew et al. .............. | 324/210 |
| 6,751,036 | B1 | * | 6/2004 | Quak et al. ............... | 360/48 |
| 6,914,738 | B1 | * | 7/2005 | Fujiwara et al. .......... | 360/68 |
| 6,954,320 | B1 | * | 10/2005 | Yang ......................... | 360/46 |
| 6,956,710 | B1 | * | 10/2005 | Yun et al. .................. | 360/53 |

(Continued)

FOREIGN PATENT DOCUMENTS

JP 11039839 A * 2/1999
JP 11250409 A * 9/1999

OTHER PUBLICATIONS

Korean Office Action for Application No. 10-2003-0070035 dated Oct. 31, 2005.

*Primary Examiner*—Wayne Young
*Assistant Examiner*—Dismery Mercedes
(74) *Attorney, Agent, or Firm*—Staas & Halsey LLP (57) ABSTRACT

A method for determining a type of a head in a hard disc drive, the head being a normal head, a weak head, or an ATE (Adjacent Track Erasure) head, and a method for adjusting a write parameter using the head type determining method. The head type determining method includes writing data via the head under multiple tracks per inch (TPI) conditions, in which TPIs are equal to a reference TPI, and wider and narrower than the reference TPI by a respective first and second predetermined ratios, and reproducing the written data, to detect a bit error rate under each TPI condition, and comparing the bit error rate under each condition to the bit error rate of the reference TPI, to determine a type of a head.

27 Claims, 7 Drawing Sheets

U.S. PATENT DOCUMENTS

| | | | |
|---|---|---|---|
| 6,999,256 B1* | 2/2006 | Kim et al. | 360/31 |
| 2003/0112541 A1* | 6/2003 | Lee et al. | 360/55 |
| 2004/0021974 A1* | 2/2004 | Shiiyama | 360/69 |
| 2004/0125478 A1* | 7/2004 | Kim et al. | 360/31 |
| 2005/0057835 A1* | 3/2005 | Kim et al. | 360/46 |

* cited by examiner

METHOD FOR DETERMINING A TYPE OF HEAD, AND METHOD FOR OPTIMIZING A WRITE PARAMETER USING THE HEAD TYPE DETERMINING METHOD IN A HARD DISC DRIVE

CROSS-REFERENCE TO RELATED APPLICATIONS

This application claims the priority of Korean Patent Application No. 2003-70035, filed on Oct. 8, 2003 in the Korean Intellectual Property Office, the disclosure of which is incorporated herein by reference.

BACKGROUND OF THE INVENTION

1. Field of the Invention

The present invention relates to a hard disc drive, and more particularly, to a method for determining a type of a head, that is, whether a head is a normal head, a weak head, or an ATE (Adjacent Track Erasure) head, and a method for adjusting a write parameter using the head type determining method.

2. Description of the Related Art

When a conventional hard disc drive prevents a write error depending upon a temperature, it optimizes write parameters such as a write current (WC) and an overshoot control (OSC) based upon temperature. That is, write parameters which are dependent upon temperature are applied to the hard disc drive by predicting a decrease in a write performance of a head depending upon a temperature. For example, Korean Laid-open Patent Publication No. 2002-65356 discloses a technology in which, after a physical characteristic of a storage device, such as a hard disc drive, is estimated in the process of manufacturing the storage device, an optimal parameter is stored in a control device of the storage device. Then, operating parameters of the hard disc drive are dynamically controlled according to a detected environmental condition and the optimal parameter. Further, an apparatus having a temperature sensor, for detecting a temperature in a hard disc drive and varying a write current according to the detected temperature is disclosed in Japanese Laid-open Patent Publication Nos. 1998-340412 and 1994-111457 and Korean Laid-open Patent Publication No. 2002-67794.

Since a coercive force of a disc becomes large at a low temperature, a write parameter is increased, to thereby increase an intensity of a magnetic field. Meanwhile, since a coercive force of a disc becomes small at a high temperature, a write parameter is lowered, to thereby lower an intensity of a magnetic field. Accordingly, a data error can be prevented when data is written.

But since a conventional write parameter optimization method does not consider a specific characteristic of each head in addition to an operating temperature of a hard disc drive, a data error cannot be effectively prevented.

Heads for use in hard disc drives are classified as one of three types: a normal head; an ATE head; and a weak head. The ATE head has a remarkable ATE (Adjacent Track Erasure) effect, and the weak head has a weak write characteristic, that is, a poor write characteristic at a low temperature.

For example, since a coercive force of a disc decreases at a high temperature, an interference between adjacent tracks occurs easily. Thus, in the ATE head, a correction value of a write parameter based upon a temperature needs to be lowered in comparison with the normal head. And since a coercive force of a disc increases at a low temperature, in the weak head, a correction value of a write parameter based upon a temperature needs to be increased in comparison with the normal head.

Since the conventional write parameter optimization method does not consider a specific characteristic of each head, but rather applies the same write parameter correction value to all kinds of heads, problems occur: namely, an interference between adjacent tracks increases in the case of an ATE head at a high temperature, and a weak write phenomenon becomes severe in the case of a weak head at a low temperature.

SUMMARY OF THE INVENTION

The present invention provides a method for determining a type of a head, that is, whether a head is a normal head, a weak head, or an ATE (Adjacent Track Erasure) head.

The present invention also provides an improved write parameter optimization method, which can correct a write parameter based on a temperature, by considering a specific characteristic of each head, depending upon an operating temperature of a hard disc drive.

To accomplish the above and/or other aspects of the present invention, there is provided a method for determining a type of a head in a hard disc drive, where the head type is one of a normal head, a weak head having a poor write characteristic at a low temperature, and an ATE (Adjacent Track Erasure) head having a remarkable ATE effect, the head discrimination method comprising: writing data via the head under multiple tracks per inch (TPI) conditions, in which TPI is equal to a reference TPI, and wider and narrower than the reference TPI by respective first and second predetermined ratios, and reproducing the written data, to detect a bit error rate under each TPI condition; and comparing a first bit error rate under the condition of the reference TPI with a second bit error rate under the condition that the TPI is wider than the reference TPI by the first predetermined ratio, and comparing the second bit error rate to a third bit error rate under the condition that the TPI is narrower than the reference TPI by the second predetermined ratio, to determine the type of head.

According to one aspect, when both the first bit error rate under the condition of the reference TPI and the second bit error rate under the condition of the TPI wider than the reference TPI by the first predetermined ratio are larger than a predetermined first reference value, the head is determined to be an ATE head. When a difference between the second bit error rate under the condition of the TPI wider than the reference TPI by the first predetermined ratio and the third bit error rate narrower than the reference TPI by the second predetermined ratio is smaller than a predetermined second reference value, the head is determined to be a weak head. Otherwise, the head is determined to be a normal head.

There is also provided a write parameter optimization method for optimizing a write parameter of a head of a hard disc drive, based upon an operating temperature of the hard disc drive, the write parameter optimization method comprising: setting a write parameter correction value based on the operating temperature of the hard disc drive; determining a type of the head of the hard disc drive, the head being one of an ATE (Adjacent Track Erasure) head having an ATE effect, a weak head having a poor write characteristic at a low temperature, and a normal head; determining an operating temperature of the hard disc drive; and correcting the write parameter of the head with reference to the determined operating temperature of the hard disc drive, the write parameter correction value based on the temperature, and the type of the head.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

In a hard disc drive, a number of tracks per inch (TPI) is varied to set a track pitch appropriate for each head in a burn-in test process, to thereby write data and reproduce the written data. In doing so, a bit error rate (BER) is measured.

Figure 1:
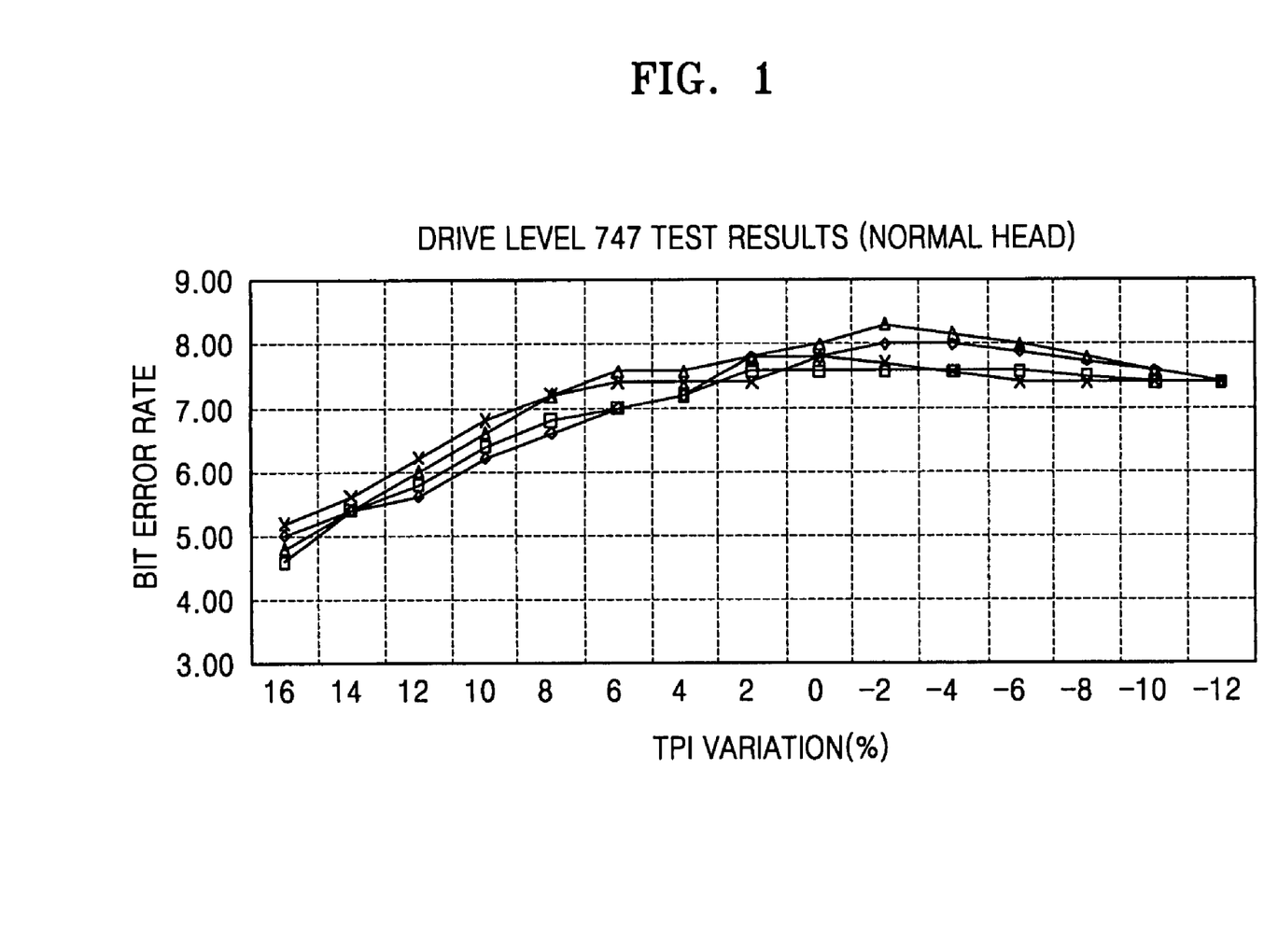
FIGS. 1 through 3 are graphical views showing characteristic curves that indicate a change of a bit error rate according to TPI (Tracks Per Inch)
Figure 2:
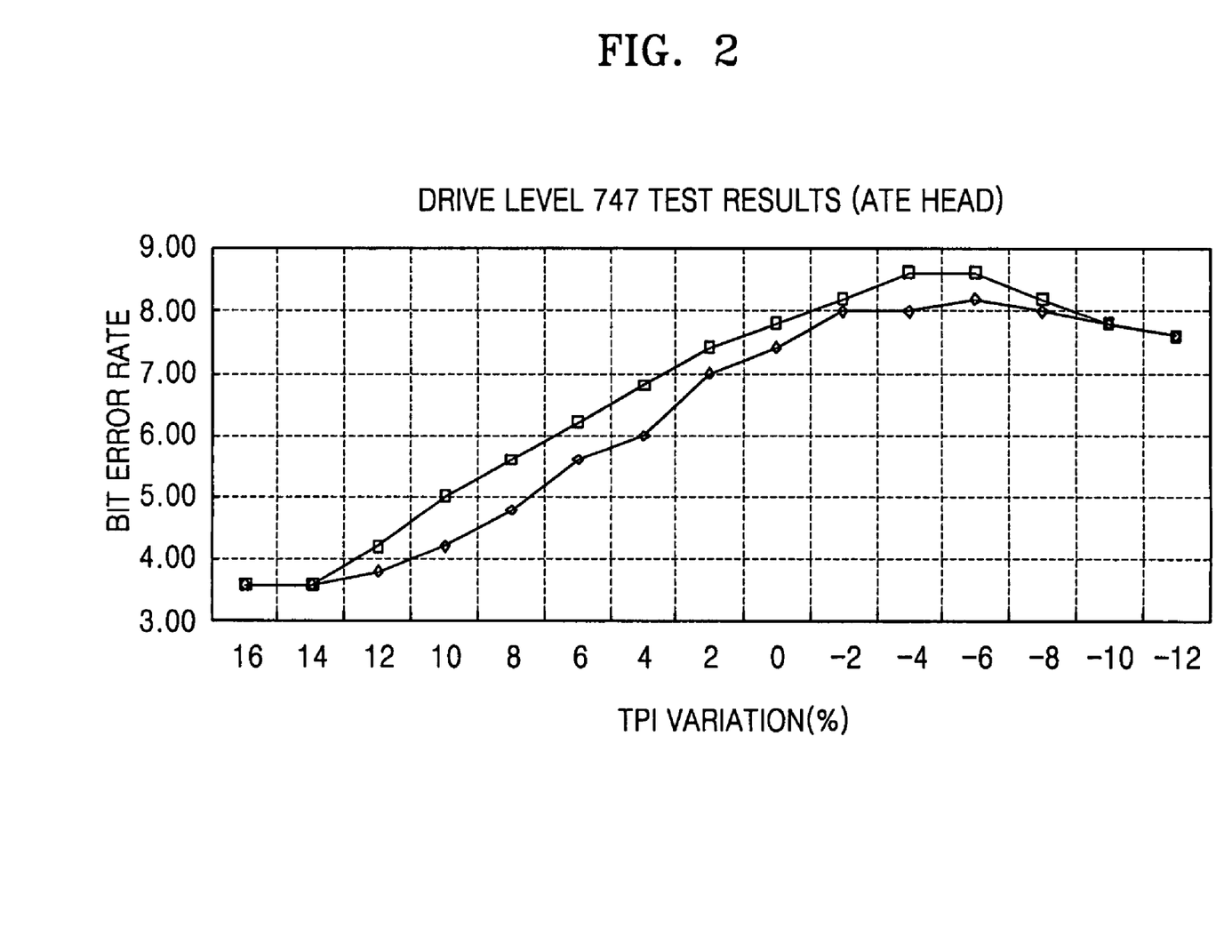
Figure 3:
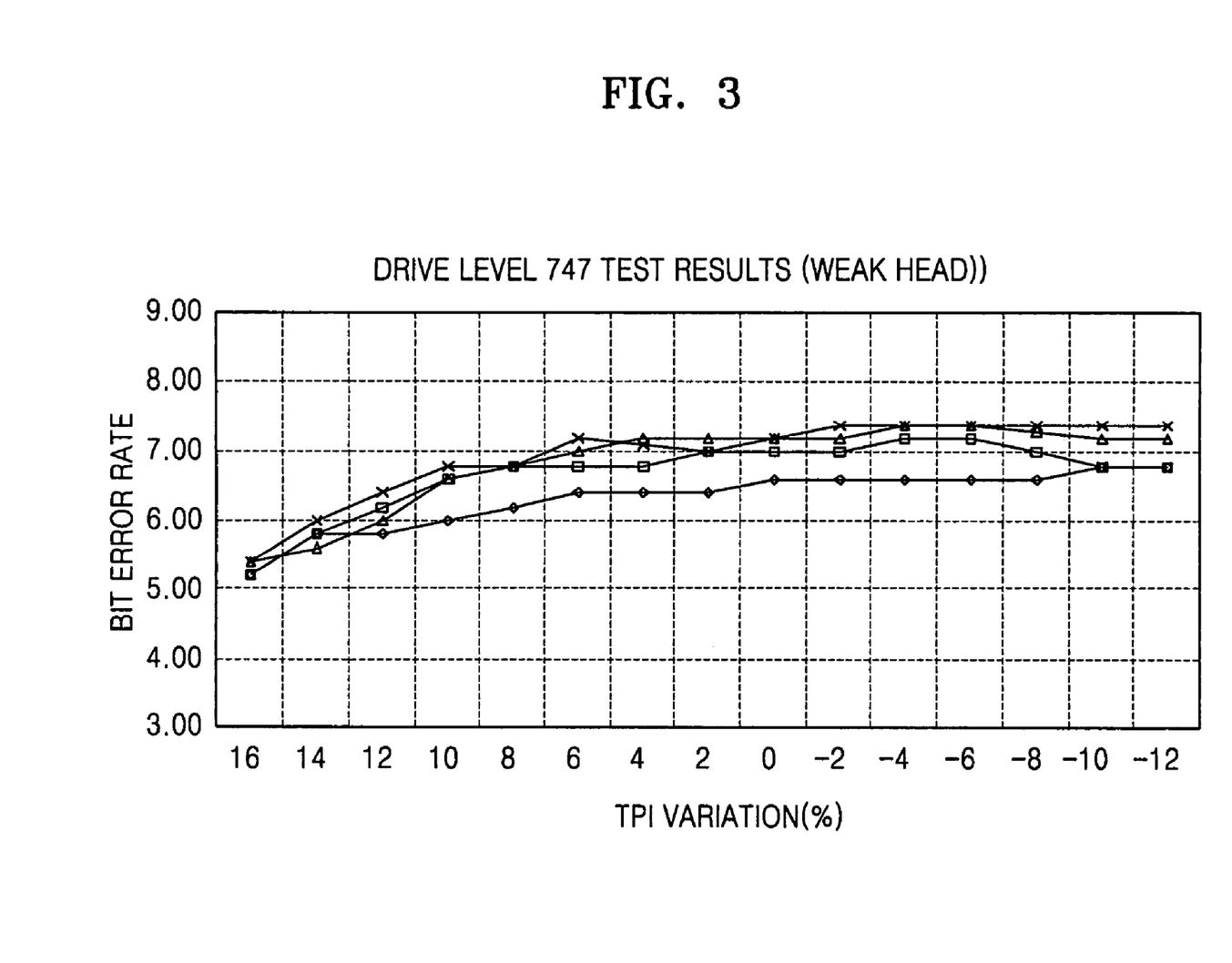

FIGS. 1 through 3 are graphical views showing characteristic curves (TPI-BER) that indicate a change of a bit error rate according to TPI (Tracks Per Inch) variation. In FIGS. 1 to 3, the horizontal axis indicates a TPI variation and the vertical axis indicates a bit error rate.

Regarding the horizontal axis, a portion where a TPI is 0% indicates a reference TPI, a portion where a TPI is 2% indicates a TPI which is larger than the reference TPI by 2%, and a portion where a TPI is −2% indicates a TPI which is smaller than the reference TPI by 2%. When a TPI is decreased, a track width is increased, while when a TPI is increased, a track width is decreased.

The bit error rate on the vertical axis is indicated as a logarithmic scale. Also, FIGS. 1 to 3 show characteristics of a normal head, an ATE head, and a weak head, respectively. FIGS. 1 to 3 show test results performed with respect to four test samples.

It can be seen that slopes of characteristic curves differ from each other according to the types of heads.

When a characteristic curve of a normal head of FIG. 1 is compared with that of an ATE head of FIG. 2, it is observed that a difference between bit error rates when TPI is high and when TPI is closer to the reference TPI is much greater with the ATE head than with the normal head.

Also, when a characteristic curve of the normal head of FIG. 1 is compared with that of a weak head of FIG. 3, it is observed that a difference between bit error rates when TPI is high and when TPI is low is much smaller with the weak head than with the normal head.

That is, it can be seen that a type of head can be discriminated by comparing bit error rates in the areas where a TPI is close to the reference TPI, TPI is high, and TPI is low, in the characteristic curves (TPI-BER) showing a change of a bit error rate according to a TPI.

Figure 4:
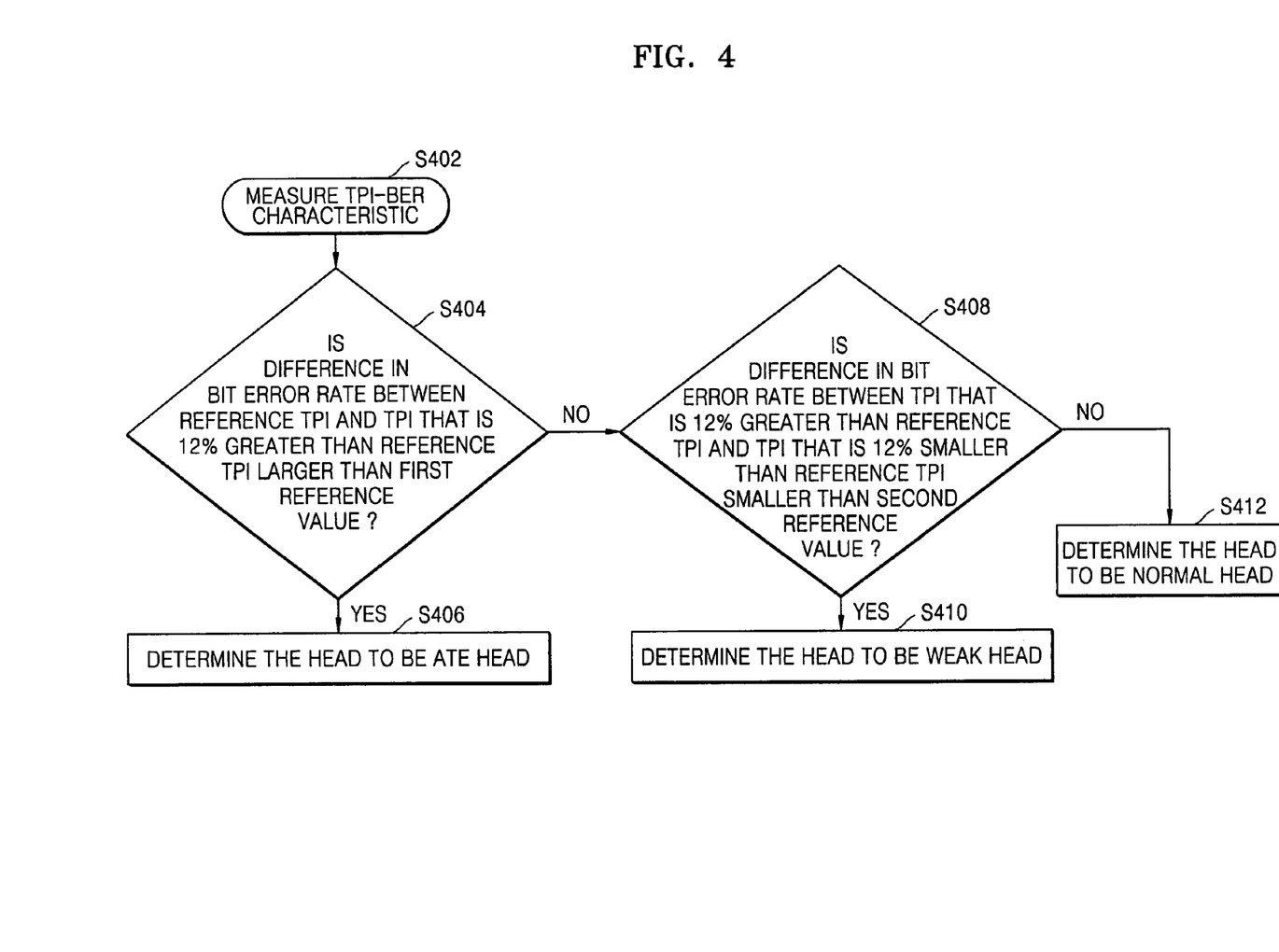
FIG. 4 is a flowchart view showing a head discriminating method according to an embodiment of the present invention.

FIG. 4 is a flowchart view showing a head discriminating method according to an embodiment of the present invention.

First, a characteristic curve showing a bit error rate according to a TPI in a head whose type is to be discriminated, is obtained by measuring a TPI-BER characteristic (S402).

A bit error rate is measured by varying a TPI around a particularly established reference TPI. The bit error rate is measured by writing predetermined test data N-times on lateral tracks, respectively adjacent to each side of a target track, and reading the data written on the target tracks. Here, a write parameter is identical irrespective of a change of a TPI in which a reference TPI means a temporal value set by testing representative normal heads. That is, the reference TPI is a normal TPI appropriate for the normal head.

In actuality, it is simpler to measure bit error rates under a reference TPI, a TPI which is increased by a predetermined ratio from the reference TPI, and a TPI which is decreased by a predetermined ratio from the reference TPI.

Here, the predetermined ratio is 12% in this embodiment of the present invention, which is an experimentally and statistically determined value. But it is understood that other values can be used.

In operation S404, it is determined whether a difference between a bit error rate in the reference TPI and that in a TPI which is increased by 12% from the reference TPI is larger than a predetermined first reference value (S404). According to one aspect, the first reference value is an experimentally and statistically determined value.

If the difference between the bit error rate in the reference TPI and that in the TPI which is increased by 12% in the positive direction from the reference TPI is larger than the predetermined first reference value in operation S404, it is determined that the head is an ATE head in operation.

Referring to FIGS. 1 and 2, it can be seen that the difference between a bit error rate in the reference TPI and that in a TPI which is increased by 12% from the reference TPI in the ATE head is much larger than the similar values with the normal head. Referring to FIGS. 1 and 2, a difference between the bit error rates at the TPI which is increased by 12% from the reference TPI in the respective cases of the normal head and the ATE head is about 1.7, which is a considerably large value when considering that the bit error rate is expressed on a logarithmic scale. In operation S406, it is determined whether the head is an ATE head by using the above-described characteristic.

If a difference between the bit error rate in the reference TPI and that in the TPI which is increased by 12% from the reference TPI is not larger than the predetermined second reference value (S404), in operation S408, it is determined whether a difference between the bit error rate in the TPI which is increased by 12% from the reference TPI and a bit error rate in a TPI which is decreased by 12% from the reference TPI is smaller than a predetermined second reference value. According to one aspect, the second reference value is an experimentally and statistically determined value.

Referring to FIGS. 1 and 3, it can be seen that the difference between a bit error rate in a TPI which is increased by 12% from the reference TPI and that in a TPI which is decreased by 12% from the reference TPI with the weak head is much smaller than with the normal head. In operation S408, it is determined whether the head is a weak head by using the above-described characteristic.

If the difference between a bit error rate in the TPI which is increased by 12% from the reference TPI and that in the TPI which is decreased by 12% from the reference TPI is smaller than the predetermined second reference value (S408), then in operation S410 it is determined that the head is a weak head.

If the difference between a bit error rate in the TPI which is increased by 12% from the reference TPI and that in the TPI which is decreased by 12% from the reference TPI is not smaller than the predetermined second reference value (S408), then in operation S412, it is determined that the head is a normal head.

According to one aspect, the head discrimination method shown in FIG. 4 is performed together with a burn-in test process, in particular, a process of establishing a TPI appropriate for a head, in a hard disc drive.

Figure 5:
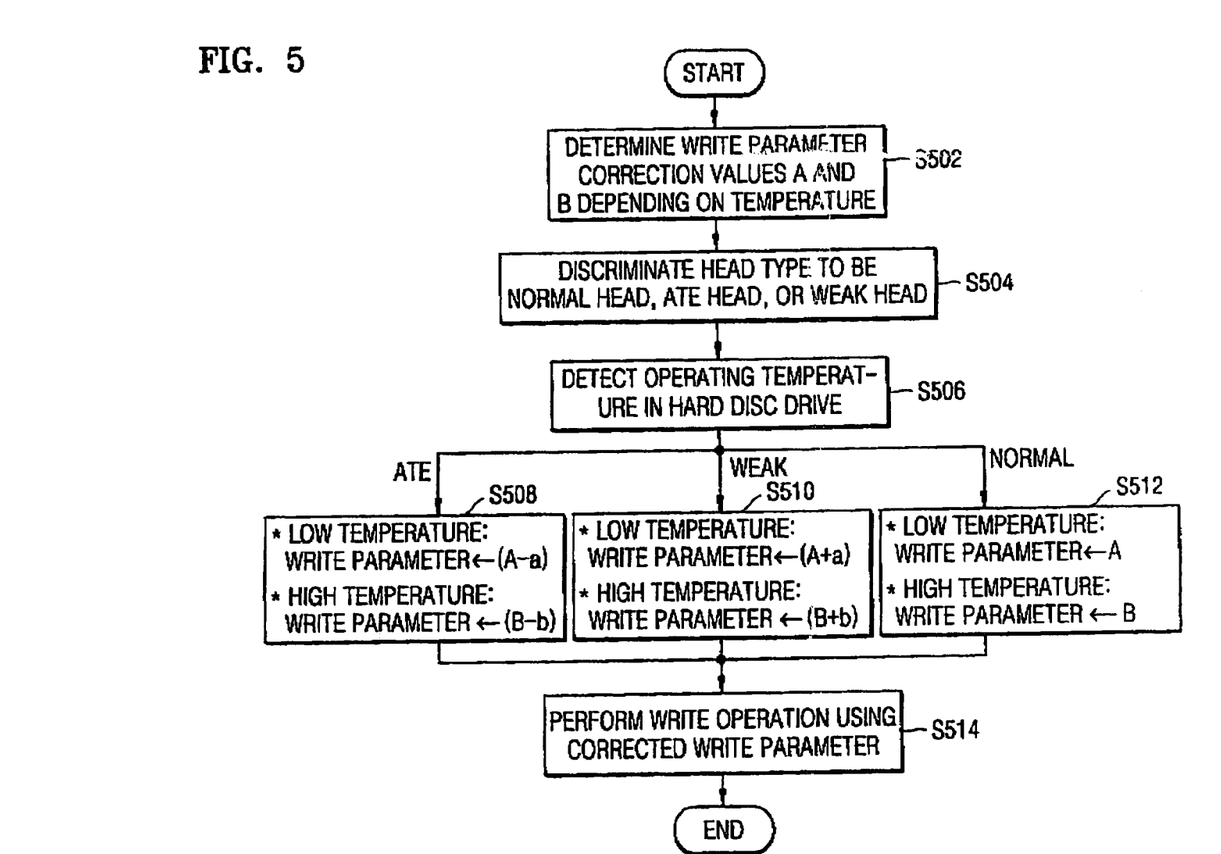
FIG. 5 is a flowchart showing a method for optimizing a write parameter according to an embodiment of the present invention.

FIG. 5 is a flowchart showing a method for optimizing a write parameter according to an embodiment of the present invention.

First, a write parameter under a normal operating temperature and write parameter correction values based upon temperature are determined in operation S502. The write parameter correction values are the same for all heads included in a hard disc drive, that is, the write parameter correction values do not vary with the type of head. In this embodiment, operation S502 is performed in the burn-in test process in the hard disc drive.

According to one aspect, to correct a write parameter, a threshold temperature is established at three areas: a low temperature; a normal temperature; and a high temperature. But it is understood that the thresholds may be established as ranges of temperatures.

In this embodiment, it is assumed that the write parameter correction value is "A" at high temperatures, and the write parameter correction value is "B" at low temperatures.

The type of a head is determined in operation S504. According to one aspect, operation S504 is performed in the burn-in test process in the hard disc drive. According to one aspect, the head discrimination of operation S504 follows the method shown in and described with reference to FIG. 4.

In operation S506, an operating temperature in the hard disc drive is determined, and a corresponding write parameter correction value is determined.

Write parameters are corrected with reference to the operating temperature of the hard disc drive determined in operation S506, the write parameter correction values established in operation S502 based upon the temperature, and the type of the head determined in operation S504.

When the head is determined to be an ATE head, the write parameter correction values "A" and "B" based upon the temperature are decreased by "a" for the low temperature and by "b" for the high temperature in operation S508.

That is, since it is better to use a write parameter as low as possible to prevent an error of data in the case of an ATE head, the write parameter correction value "A" for the low temperature, and the write parameter correction value "B" for the high temperature, are reduced by "a" and "b", respectively.

When the head is determined to be a weak head, the write parameter correction values "A" and "B" based upon the temperature are increased by "a" for the low temperature and by "b" for the high temperature in operation S510.

That is, since it is better to use a write parameter as high as possible to prevent an error of data in the case of a weak head, the write parameter correction value "A" for the low temperature, and the write parameter correction value "B" for the high temperature, are increased by "a" and "b", respectively.

When the head is determined to be a normal head, in operation S512, the write parameter correction values "A" and "B", established in operation S502, are not modified.

Thereafter, in operation S514 a write operation is performed with the corrected write parameter.

Figure 6:
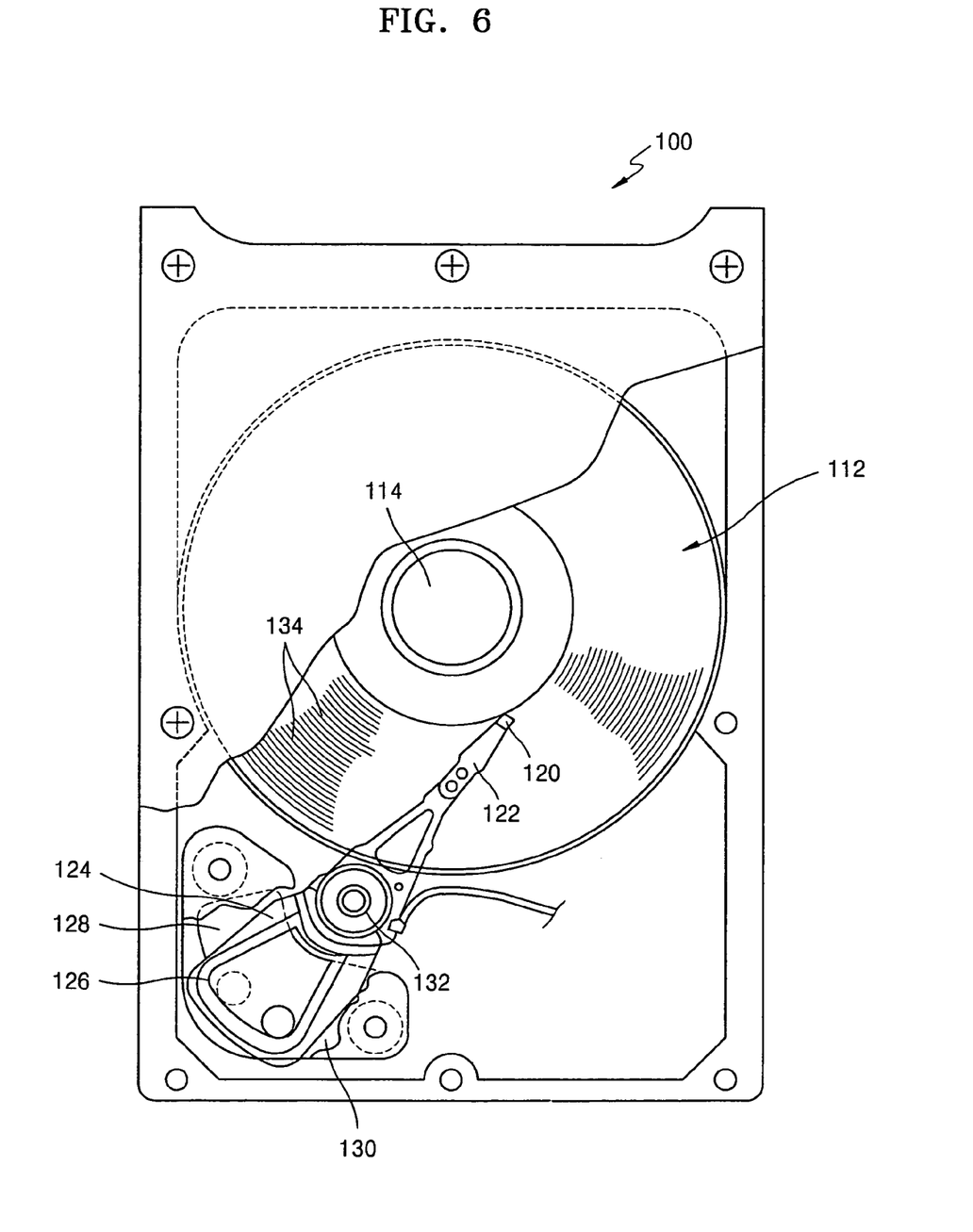
FIG. 6 is a top view showing a configuration of a hard disc drive to which the present invention is applied.

FIG. 6 is a top view showing a configuration of a hard disc drive 100 to which the present invention is applied.

Referring to FIG. 6, the hard disc drive 100 includes at least one disc 112 which is made to rotate by a spindle motor 114. The hard disc drive 100 also includes a head 120 which is located adjacent to a surface of the disc 112.

The head 120 detects a magnetic field formed on the surface of the disc 112, and can read and write information from and on the disc 112 which rotates, by magnetizing the surface of the disc 112. Although a single head is shown in FIG. 6, it should be understood that the head is a write head magnetizing the disc 112 and a read head, separated from the write head, detecting the magnetic field of the disc 112.

The head 120 has a structure to produce an air bearing between the head and the surface of the disc 112. The head 120 is connected with a head stack assembly (HSA) 122. The head stack assembly (HSA) 122 is attached to an actuator arm 124 having a voice coil 126. The voice coil 126 is located adjacent to a magnetic assembly 128, which, in combination with the voice coil 126, designates a voice coil motor (VCM) 130. Current supplied to the voice coil 126 generates a torque which rotates the actuator arm 124 with respect to a bearing assembly 132. Rotation of the actuator arm 124 moves the head across the surface of the disc 112.

Information is stored in the annular tracks 134 on the disc 112. Generally, the disc 112 has a data zone where user data is written, a parking zone where a head is located when the drive is not used, and a maintenance cylinder. Values such as a type of a head, write parameter correction values "A" and "B" at low and high temperatures, and write parameter correction values "a" and "b" according to the type of the head, are stored in the maintenance cylinder.

Figure 7:
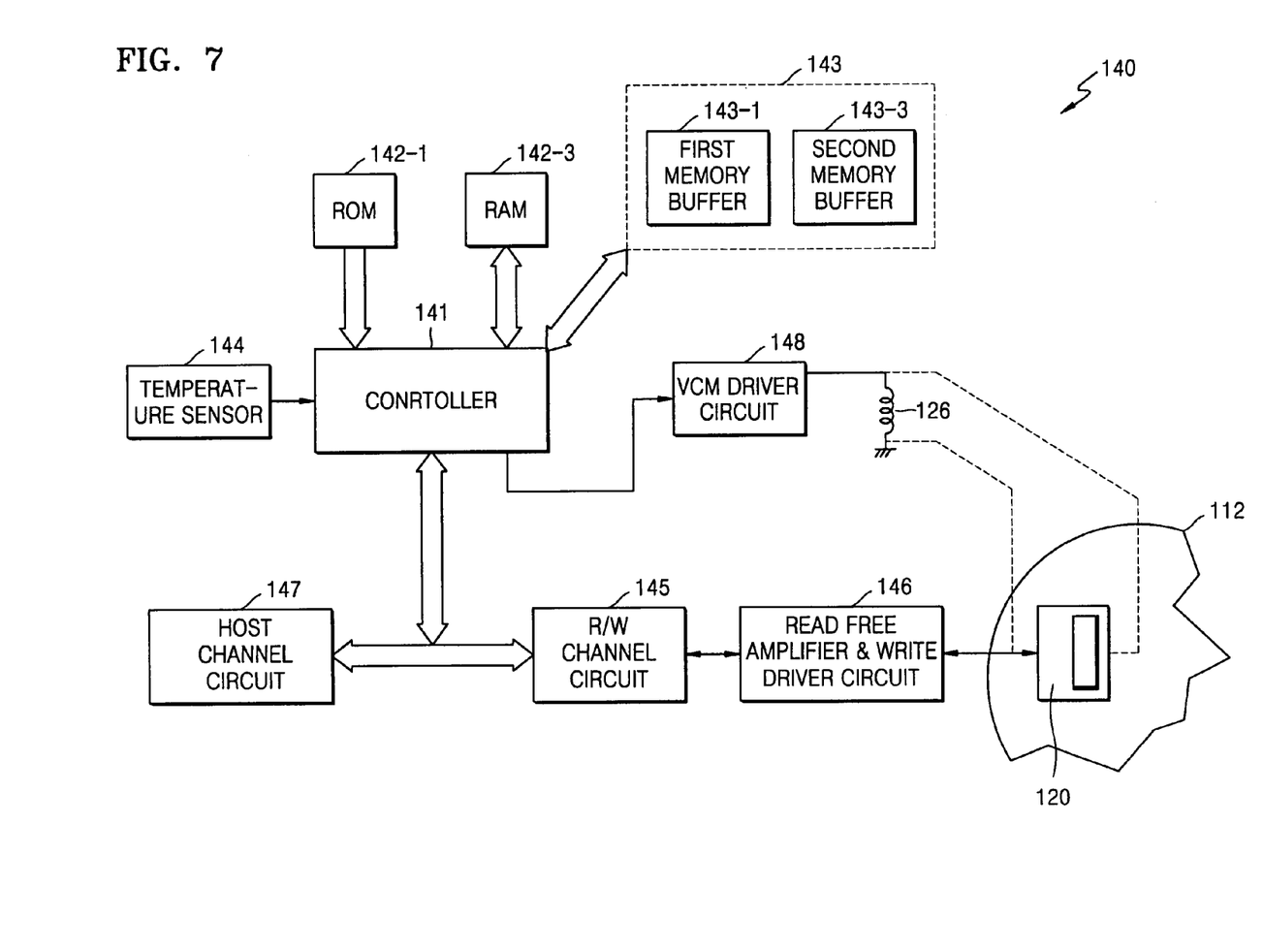
FIG. 7 is a block diagram showing a control device which controls the hard disc drive shown in FIG. 6.

FIG. 7 is a block diagram showing a control device 140, which controls the hard disc drive 100 shown in FIG. 6.

Referring to FIG. 7, the control device 140 includes a controller 141, which is connected with the head 120 by a read/write (R/W) channel circuit 145, and a read free amplifier and write driver circuit 146. According to one aspect, the controller 141 is a digital signal processor (DSP). According to another aspect, the controller 141 is a microprocessor. According to yet another aspect, the controller 141 is a microcontroller.

The controller 141 supplies a control signal to the read/write (R/W) channel circuit 145 to read data from the disc 112, and write data on the disc 112. According to one aspect, a write parameter is controlled according to a temperature detected by a temperature sensor 144.

According to one aspect, information is transmitted from the read/write (R/W) channel circuit 145 to a host interface circuit 147. The host interface circuit 147 includes a control circuit that allows the hard disc drive to interface with a system such as a personal computer.

The read/write (R/W) channel circuit 145 performs a signal processing operation, which converts an analog signal, which is read from the head 120 and amplified in the read free amplifier and write driver circuit 146, into a digital signal that can be read by a host computer (not shown), to then be output to the host interface circuit 147. The read/write (R/W) channel circuit 145 also receives user data via the host interface circuit 147 from the host computer and converts the received user data into a write current that can be written onto the disc, to then be output to the read free amplifier and write driver 146.

The controller 141 is also connected with a VCM driver circuit 148, which supplies a driving current to the voice coil 126. The controller 141 supplies a control signal to the VCM driver circuit 148 to control excitation of the VCM 130 and movement of the head 120.

The controller 141 is connected to a non-volatile memory such as a read only memory (ROM) or flash memory 142-1, and a volatile memory, such as a random access memory (RAM) 142-3. The memory devices 142-1 and 142-3 contain instructions and data that are used by the controller 141 to execute a software routine.

According to one aspect, examples of software routines include a seek routine, in which the head moves from one track to another, and a following routine, in which the head follows a target sector in a track. The seek routine includes a servo control routine to guarantee that the head moves to a specified track.

Also, a program that controls a write parameter based upon a temperature is stored in the memory devices 142-1 and 142-3. According to one aspect, at least one threshold temperature value is also stored therein. Accordingly, the controller 141 determines a position of a magnetic head, and controls a write parameter when it is determined that a temperature detected by the temperature sensor 144 is not more than a threshold temperature, when power is applied to the controller 141. Here, the threshold temperature is used to judge whether an operating temperature of the hard disc drive is high or low. According to one aspect, values for determining a high temperature condition and a low temperature condition are established as the threshold temperature values.

According to one aspect, a buffer memory 143 stores data to be written in a first buffer memory 143-1 if a write instruction is given from the host computer. According to one aspect, a second buffer memory 143-3 is a memory where data reproduced from the disc 112 is temporarily stored.

If the hard disc drive 100 receives a write instruction from the host computer, data to be written is stored in the first buffer memory 143-1. The temperature sensor 144 receives a control signal from the controller 141, and then detects the temperature of the hard disc drive 100.

Then, the controller 141 determines whether the measured temperature T transmitted from the temperature sensor 144 falls within the high or low temperature conditions.

If the measured temperature T falls within the high or low temperature conditions, the controller 141 corrects a write parameter with reference to the write parameter correction values "A" and "B" stored in the maintenance cylinder and the write parameter correction values "a" and "b", depending upon the type of the head 120.

If the head 120 is determined to be a normal head, the write parameter correction value established in operation S502 is used unmodified.

If the head 120 is determined to be an ATE head, the write parameter correction values "A" and "B" upon the temperature are decreased by "a" for the low temperature, and by "b" for the high temperature.

If the head 120 is determined a weak head, the write parameter correction values "A" and "B" upon the temperature are increased by "a" for the low temperature, and by "b" for the high temperature.

Accordingly, once any corrections determined to be necessary are made to the write parameter, the controller 141 applies the write parameter to the write head, to thus enable the head to perform a write operation.

As is described above, embodiments of the present invention provide an excellent effect capable of determining the characteristic of the head in a hard disc drive, in a simple method.

As is described above, the head discrimination method according to an embodiment of the present invention writes data while varying TPI, reads the written data to thereby judge a bit error rate, and determines a type of a head, that is, whether a head is a normal head, an ATE (Adjacent Track Erasure) head, or a weak head, with reference to a change of a bit error rate according to a change of TPI.

The write parameter optimization method according to an embodiment of the present invent discriminates a type of a head, and corrects a write parameter depending upon the discriminated type of the head, to thereby provide an effect of preventing an error of data.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for determining a type of a head in a hard disc drive, where the head type is one of a normal head, a weak head having a poor write characteristic at a low temperature, and an ATE (Adjacent Track Erasure) head having an ATE effect, the head discrimination method comprising:

writing data via the head under multiple tracks per inch (TPI) conditions, in which TPI is equal to a reference TPI, and wider and narrower than the reference TPI by respective first and second predetermined ratios, and reproducing the written data, to detect a bit error rate under each TPI condition; and comparing the bit error rates under the TPI conditions by comparing a first bit error rate under the condition of the reference TPI with a second bit error rate under the condition that the TPI is wider than the reference TPI by the first predetermined ratio, and comparing the second bit error rate with a third bit error rate under the condition that the TPI is narrower than the reference TPI by the second predetermined ratio, to determine the type of head.

2. The head discrimination method of claim 1, wherein, the comparing of the bit error rates under the TPI conditions comprises:

determining the head to be an ATE head when both the first bit error rate under the condition of the reference TPI and the second bit error rate under the condition of the TPI wider than the reference TPI by the first predetermined ratio are larger than a predetermined first reference value;

determining the head to be a weak head when a difference between the second bit error rate under the condition of the TPI wider than the reference TPI by the first predetermined ratio and the third bit error rate narrower than the reference TPI by the second predetermined ratio is smaller than a predetermined second reference value; and otherwise, determining the head to be a normal head.

3. A write parameter optimization method for optimizing a write parameter of a head of a hard disc drive, based upon an operating temperature of the hard disc drive, the write parameter optimization method comprising:

setting a write parameter correction value based on the operating temperature of the hard disc drive;

determining a type of the head of the hard disc drive, the head being one of an ATE (Adjacent Track Erasure) head having an ATE effect, a weak head having a poor write characteristic at a low temperature, and a normal head;

determining an operating temperature of the hard disc drive; and correcting the write parameter of the head with reference to the determined operating temperature of the hard disc drive, the write parameter correction value based on the temperature, and the type of the head, wherein the write parameter correction value based on the temperature is reduced by a predetermined value if the head is an ATE head, the write parameter correction value based on the temperature is increased by a predetermined value if the head is a weak head, and the write parameter correction value based on the temperature is unaltered if the head is a normal head.

4. A method to determine a type of head in a hard disc drive, the head type being one of an adjacent track erasure (ATE) head, a weak head, and a normal head, the method comprising:

determining a bit error rate (BER) for each of multiple tracks per inch (TPI) conditions; and comparing the BERs to determine the type of head.

5. The method according to claim 4, wherein the determining of the BER for each of the multiple TPI conditions comprises:

writing data on a disc of the hard disc drive under the multiple TPI conditions; and determining the BER for each TPI condition.

6. The method according to claim 5, wherein the determining the BER for each TPI condition comprises:

determining a bit error rate (BER) for each of
a reference TPI condition corresponding to a reference TPI,
a greater TPI condition in which the TPI is greater than the reference TPI by a first predetermined ratio, and
a lesser TPI condition, in which the TPI is less than the reference TPI by a second predetermined ratio.

7. The method according to claim 6, wherein the comparing the BERs to determine the type of head comprises:

determining whether a difference in BERs between the reference TPI condition and the greater TPI condition is greater than a first reference value, and if so, determining that the head is an ATE head.

8. The method according to claim 7, wherein the comparing the BERs to determine the type of head further comprises:

if the difference in BERs between the reference TPI condition and the greater TPI condition is not greater than the first reference value, determining whether a difference in BERs between the lesser TPI condition and the greater TPI condition is less than a second reference value;

if the difference in BERs between the lesser TPI condition and the greater TPI condition is less than the second reference value, determining that the head is a weak head; and if the difference in BERs between the lesser TPI condition and the greater TPI condition is not less than the second reference value, determining that the head is a normal head.

9. A method for optimizing a write parameter for a head of a hard disc drive, the method comprising:

determining write parameter correction values that vary according to temperature and are independent of head type;

determining the head type of head in the hard disc drive, the head type being one of an adjacent track erasure (ATE) head, a weak head, and a normal head;

determining an operating temperature of the hard disc drive;

selecting the write parameter correction value corresponding to the determined operating temperature;

if the head type is determined to be an ATE head, decreasing the selected write parameter correction value by a predetermined value to create a modified write parameter correction value;

if the head type is determined to be a weak head, increasing the selected write parameter correction value by the predetermined value to create the modified write parameter correction value; and if the head type is determined to be a normal head, using the selected write parameter correction value as the modified write parameter correction value.

10. The method according to claim 9, further comprising:
performing a write operation using the modified write parameter correction value.

11. The method according to claim 9, wherein the determining the write parameter correction values that vary according to temperature and are independent of head type operation is performed during a burn-in process for the hard disc drive.

12. The method according to claim 9, wherein the determining the head type is performed during a burn-in process for the hard disc drive.

13. The method according to claim 9, wherein the determining the head type comprises:

determining a bit error rate (BER) for each of multiple tracks per inch (TPI) conditions; and comparing the BERs to determine the type of head.

14. The method according to claim 13, wherein the determining of the BER for each of the multiple TPI conditions comprises:

writing data on a disc of the hard disc drive under the multiple TPI conditions; and determining the BER for each TPI condition.

15. The method according to claim 14, wherein the determining the BER for each TPI condition comprises:

determining a bit error rate (BER) for each of
a reference TPI condition corresponding to a reference TPI,
a greater TPI condition in which the TPI is greater than the reference TPI by a first predetermined ratio, and
a lesser TPI condition, in which the TPI is less than the reference TPI by a second predetermined ratio.

16. The method according to claim 15, wherein the comparing the BERs to determine the type of head comprises:

determining whether a difference in BERs between the reference TPI condition and the greater TPI condition is greater than a first reference value, and if so, determining that the head is an ATE head.

17. The method according to claim 16, wherein the comparing the BERs to determine the type of head comprises:
    if the difference in BERs between the reference TPI condition and the greater TPI condition is not greater than the first reference value, determining whether a difference in BERs between the lesser TPI condition and the greater TPI condition is less than a second reference value;
    if the difference in BERs between the lesser TPI condition and the greater TPI condition is less than the second reference value, determining that the head is a weak head; and
    if the difference in BERs between the lesser TPI condition and the greater TPI condition is not less than the second reference value, determining that the head is a normal head.

18. A method for optimizing a write parameter for a head of a hard disc drive, the method comprising:
    determining first and second write parameter correction values for respective first and second temperature ranges;
    determining the type of head in the hard disc drive, the head type being one of an adjacent track erasure (ATE) head, a weak head, and a normal head;
    determining an operating temperature of the hard disc drive;
    selecting one of the first and second write parameter correction values in accordance with the determined operating temperature;
    if the head type is determined to be an ATE head, decreasing the selected write parameter correction value by a predetermined value to create a modified write parameter correction value;
    if the head type is determined to be a weak head, increasing the selected write parameter correction value by the predetermined value to create the modified write parameter correction value; and
    if the head type is determined to be a normal head, using the selected write parameter correction value as the modified write parameter correction value.

19. The method according to claim 18, further comprising:
    performing a write operation using the modified write parameter correction value.

20. A method for determining a type of head in a hard disc drive, the head type being one of an adjacent track erasure (ATE) head, a weak head, and a normal head, the method comprising:
    writing data under multiple tracks per inch (TPI) conditions;
    reading the written data to judge a bit error rate for each TPI condition; and
    determining a type of a head with reference to a change of a bit error rate according to a change of TPI.

21. Computer readable media for determining a type of head in a hard disc drive, the head type being one of an adjacent track erasure (ATE) head, a weak head, and a normal head, the computer readable media comprising:
    a first set of instructions to determine a bit error rate (BER) for each of multiple tracks per inch (TPI) conditions; and
    a second set of instructions to compare the BERs to determine the type of head.

22. The computer readable media according to claim 21, wherein the first set of instructions comprises:
    a third set of instructions to write data on a disc of the hard disc drive under the multiple TPI conditions; and
    a fourth set of instructions to determine the BER for each TPI condition.

23. The computer readable media according to claim 22, wherein the fourth set of instructions comprises:
    a fifth set of instructions to determine a bit error rate (BER) for each of
        a reference TPI condition corresponding to a reference TPI,
        a greater TPI condition in which the TPI is greater than the reference TPI by a first predetermined ratio, and
        a lesser TPI condition, in which the TPI is less than the reference TPI by a second predetermined ratio.

24. The computer readable media according to claim 23, wherein the second set of instructions comprises:
    a sixth set of instructions to determine whether a difference in BERs between the reference TPI condition and the greater TPI condition is greater than a first reference value, and if so, determine that the head is an ATE head.

25. The computer readable media according to claim 24, wherein the second set of instructions further comprises:
    a seventh set of instructions to determine whether a difference in BERs between the lesser TPI condition and the greater TPI condition is less than a second reference value, if the difference in BERs between the reference TPI condition and the greater TPI condition is not greater than the first reference value;
    an eighth set of instructions to determine that the head is a weak head, if the difference in BERs between the lesser TPI condition and the greater TPI condition is less than the second reference value; and
    a ninth set of instructions to determine that the head is a normal head, if the difference in BERs between the lesser TPI condition and the greater TPI condition is not less than the second reference value.

26. Computer readable media for optimizing a write parameter for a head of a hard disc drive, the computer readable media comprising:
    a first set of instructions to determine first and second write parameter correction values for respective first and second temperature ranges;
    a second set of instructions to determine the type of head in the hard disc drive, the head type being one of an adjacent track erasure (ATE) head, a weak head, and a normal head;
    a third set of instructions to determine an operating temperature of the hard disc drive;
    a fourth set of instructions to select one of the first and second write parameter correction values in accordance with the determined operating temperature;
    a fifth set of instructions to decrease the selected write parameter correction value by a predetermined value to create a modified write parameter correction value, if the head type is determined to be an ATE head;
    a sixth set of instructions to increase the selected write parameter correction value by the predetermined value to create the modified write parameter correction value, if the head type is determined to be a weak head; and
    a seventh set of instructions to use the selected write parameter correction value as the modified write parameter correction value, if the head type is determined to be a normal head.

27. The computer readable media according to claim 26, further comprising:
    an eighth set of instructions to perform a write operation using the modified write parameter correction value.

* * * * *

UNITED STATES PATENT AND TRADEMARK OFFICE
CERTIFICATE OF CORRECTION

| | | |
|---|---|---|
| PATENT NO. | : 7,110,197 B2 | Page 1 of 1 |
| APPLICATION NO. | : 10/950812 | |
| DATED | : September 19, 2006 | |
| INVENTOR(S) | : Jae-deog Cho | |

It is certified that error appears in the above-identified patent and that said Letters Patent is hereby corrected as shown below:

Column 9, Line 23, change "whereiin" to --wherein--.

Signed and Sealed this

Twentieth Day of February, 2007

JON W. DUDAS
*Director of the United States Patent and Trademark Office*